United States Patent [19]

Steinke

[11] Patent Number: 4,563,328
[45] Date of Patent: Jan. 7, 1986

[54] NUCLEAR REACTOR FUEL ASSEMBLY

[75] Inventor: Alexander Steinke, Ebermannstadt, Fed. Rep. of Germany

[73] Assignee: Kraftwerk Union Aktiengesellschaft, Mulheim, Fed. Rep. of Germany

[21] Appl. No.: 545,064

[22] Filed: Oct. 25, 1983

[30] Foreign Application Priority Data

Oct. 28, 1982 [DE] Fed. Rep. of Germany ....... 3240061

[51] Int. Cl.[4] .............................................. G21C 3/30
[52] U.S. Cl. .................... 376/446; 376/353; 376/362; 285/342
[58] Field of Search ................ 285/39, 158, 189, 342, 285/343; 376/353, 362, 364, 446

[56] References Cited

U.S. PATENT DOCUMENTS

| 1,383,487 | 7/1921 | Rutledge | 285/158 |
| 2,347,651 | 5/1944 | Washam, Jr. | 285/158 |
| 3,377,254 | 4/1968 | Frisch | 376/446 |
| 4,219,386 | 8/1980 | Osborne et al. | 376/446 |
| 4,416,848 | 11/1983 | Feutrel | 376/446 |

Primary Examiner—Deborah L. Kyle
Assistant Examiner—Richard W. Wendtland
Attorney, Agent, or Firm—Herbert L. Lerner; Laurence A. Greenberg

[57] ABSTRACT

A nuclear reactor fuel assembly with two support plates and a holding rod connecting the two support plates rigidly with mutual spacing, the holding rod having a longitudinal axis passing through both support plates, and being held at one end in a lead-through in one of the two support plates, includes, in the lead-through, an elongated holding body for the holding rod rotatable about the longitudinal axis thereof, and displaceable in direction of the longitudinal axis thereof coaxially with the lead-through; the holding body being rigidly connectible by a rotation relative to the holding rod about the longitudinal axis thereof to an end of the holding rod and tightenable against a holding shoulder in the one support plate and detachable from the holding rod; and a spring element braced against the support plate and pressing the holding body elastically against the holding shoulder.

6 Claims, 3 Drawing Figures

NUCLEAR REACTOR FUEL ASSEMBLY

SPECIFICATION:

The invention relates to a nuclear reactor fuel assembly with two support plates, and a holding rod connecting the two support plates rigidly with mutual spacing, the holding rod having a longitudinal axis passing through both support plates, and being held at one end in a lead-through in one of the two support plates.

It is customary to provide such a holding rod at the inside of the support plates with a rigid holding body for these support plates and to hold the holding rod at the two support plates by providing a holding nut screwed on the outside of the support plates to the end of the holding rod which extends through the respective lead-through and is formed with an external thread.

It is often necessary, however, to loosen at least one of the two support plates from the holding rod again in order to disassemble from the nuclear reactor fuel assembly and assemble therein, respectively, fuel rods containing nuclear fuel which are arranged parallel to the holding rod between the two support plates and are guided respectively in a mesh of spacer grids, for example, for the purpose of repair, replacement or inspection.

Especially, if the nuclear reactor fuel assembly was in a nuclear reactor during operation of the latter, it must be arranged under water, as an irradiated nuclear reactor fuel assembly, for the assembly and disassembly, respectively, of the fuel rods. Assembly of this irradiated fuel assembly, disposed under water, can be accomplished only with remotely controlled tools, because of the radioactive radiation emanating therefrom. The nuts customarily screwed onto the rod ends are poorly suited for assembling with remotely controlled tools, because they have become hard to turn during the dwell time of the nuclear reactor fuel assembly in the nuclear reactor and can get lost after they have been detached from the ends, in the pit in which the underwater assembly takes place.

It is an object of the invention to provide a nuclear reactor fuel assembly, the holding rods of which are readily loosenable from the support plates under water by a remotely controlled tool if this nuclear reactor fuel assembly had previously been arranged in a nuclear reactor under operation.

With the foregoing and other objects in view, there is provided, in accordance with the invention, a nuclear reactor fuel assembly with the two support plates and a holding rod connecting the two support plates rigidly with mutual spacing, the holding rod having a longitudinal axis passing through both support plates, and being held at one end in a lead-through in one of the two support plates, comprising, in the lead-through, an elongated holding body for the holding rod rotatable about the longitudinal axis thereof, and displaceable in direction of the longitudinal axis thereof coaxially with the lead-through; the holding body being rigidly connectible by a rotation relative to the holding rod about the longitudinal axis thereof to an end of the holding rod and tightenable against a holding shoulder in the one support plate and detachable from the holding rod; and a spring element braced against the support plate and pressing the holding body elastically against the holding shoulder.

In accordance with another feature of the invention, the holding shoulder is located within and the holding body is tightenable against the holding shoulder within the lead-through. This elongated support body can be arranged captively i.e. so that it can't be lost, in the lead-through. With it, there can be associated a key which belongs to a remotely controlled single-spindle tool by which it is turnable about the longitudinal axis thereof for producing and releasing, respectively, the rigid connection with and from the holding rod. The pressure with which the spring element presses the holding body elastically against the holding shoulder secures the holding body, by friction between the holding body and the holding shoulder, against relative rotation about the longitudinal axis thereof with respect to the support plate and, thereby, the rigid connection between the holding body and the holding rod against loosening or detachment by itself.

In accordance with an added feature of the invention, the end of the holding rod is secured at the lead-through against relative rotation about the longitudinal axis with respect to the support plate.

In accordance with an additional feature of the invention, the end of the holding rod is formed like a sleeve and has an internal thread, and the holding body is cylindrical and has an external thread for screwing the sleeve-like end of the holding rod thereon.

Proper reassembly of an irradiated nuclear reactor fuel assembly is thereby assured even if this irradiated nuclear reactor fuel assembly has several holding rods at the two support plates, which, after one of the support plates is disassembled, finally have different lengths because of different relaxations of the material stresses developed in the nuclear reactor.

In accordance with still another feature of the invention, the end of the holding rod has a cross section with a polygonal outer contour and engages the lead-through which is formed with a matching polygonal cross section for securing the holding rod against the relative rotation with the holding body.

In accordance with again an additional feature of the invention, the holding body is formed with a stop shoulder at the support plate, the stop shoulder being spaced from the holding shoulder in the axial direction of the lead-through.

In accordance with a further feature of the invention, the holding shoulder, as viewed in direction of the longitudinal axis of the holding rod is located between the stop shoulder and the other of the two support plates.

In accordance with a concomitant feature of the invention, the spring element is a compression coil spring mounted on the outside of the holding body and being coaxial therewith, the coil spring being braced at one end thereof against the stop shoulder, and at the other end thereof, against the holding shoulder at the outside of the holding body.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
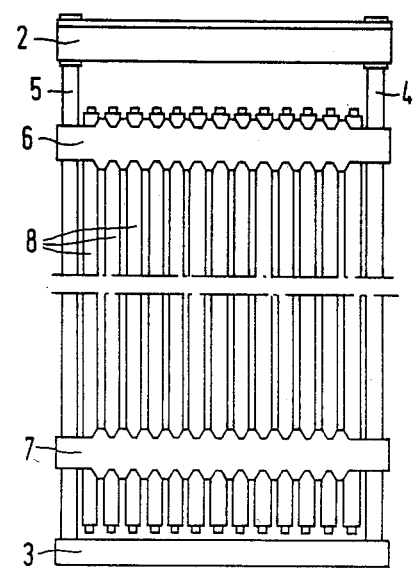
FIG. 1 is a greatly diagrammatic side elevational view of a nuclear reator fuel assembly for a pressurized-water nuclear reactor in accordance with the invention.
Figure 3:
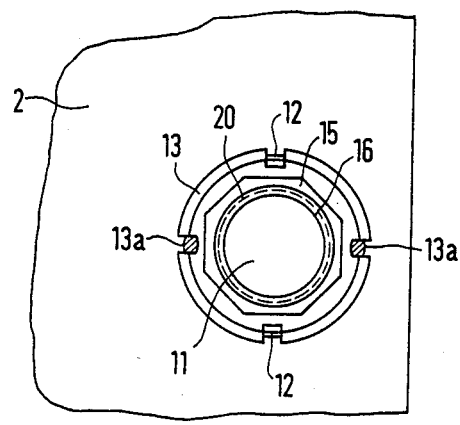
FIG. 3 is a bottom plan view of the nuclear-reactor fuel assembly parts shown in FIG. 2.

Referring now to the drawing and first, particularly, to FIG. 1, there is shown a nuclear fuel assembly intended for a pressurized-water nuclear reactor and having two support plates 2 and 3 formed of metal. Further seen are two holding rods 4 and 5 of metal, the longitudinal axes of which pass through the two mutually parallel support plates 2 and 3 at an angle of 90° thereto, and which are held at each end, respectively at one of the two support plates 2 and 3. Each of the two holding rods 4 and 5 is guided through a mesh in a plurality of metal spacer grids 6, 7, which are disposed, as viewed in the longitudinal direction of the holding rods 4 and 5, between the two support plates 2 and 3, and held by the support rods 4 and 5, only two of the spacer grids 6 and 7 being shown in FIG. 1. Through other meshes of the spacer grids 6 and 7, there extend respective fuel rods 8 formed mainly of a cladding tube of metal filled with nuclear fuel and closed off gas-tightly at both ends thereof. The fuel rods 8 are not fastened to any of the two support plates 2 and 3, but rather are mounted elastically in the meshes of the spacer grids with play between them and the two support plates 2 and 3 in the direction of the longitudinal axes of the fuel rods 8. They can therefore expand unhindered in the axial direction i.e. in the longitudinal direction of the nuclear reactor fuel assembly 2.

Figure 2:
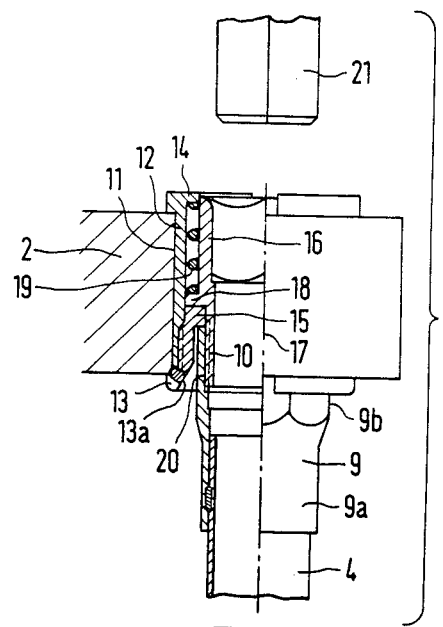
FIG. 2 is a partly longitudinal sectional view of the rod end of a holding rod showing in detail one of the two support plates of the nuclear reactor fuel assembly according to FIG. 1.

At the upper rod end, as viewed in FIG. 2, for example, the tubular support rod 4 of the nuclear reactor fuel assembly according to FIG. 1, has a sleeve 9 which is mounted at one end 9a thereof on the holding rod 4 and is firmly connected thereto by spot welding free of tolerances and stresses. At the other end thereof, the sleeve 9 is formed with an internal thread 10 and is provided with a cross section having a polygonal outer contour, for example, with a cross section of a regular octagon. In the support plate 2, a lead-through or passage 11 is provided for the rod end of the holding rod 4, and has received or plugged therein a sleeve 12 from the outside of the support plate 2, the sleeve 12 having an external flange resting against this outside of the support plate 2, the inside of the support plate 2, a sleeve 13 is screwed into the sleeve 12 and has an external flange resting against this inside of the support plate 2. Both of the sleeves 12 and 13 are additionally welded to the inside of the support plate 2 by welds 13a and are thereby secured against torsion or rotation.

An annular coaxial stop shoulder 14 extends radially inwardly from the sleeve 12 at the outside of the support plate 2; the sleeve 13 is formed radially inwardly and therefore within the lead-through 11, with an annular coaxial stop shoulder 15 spaced in axial direction from the stop shoulder 14 and located between this stop shoulder 14 and the inside of the support plate 2. In the lead-through 11, there is further guided an elongated holding body 16 which is rotatable about the longitudinal axis 17 thereof and movable in the direction of this longitudinal axis 17. This holding body 16 is formed of a hollow cylinder coaxial with the lead-through 11 and having an outer cylindrical surface provided with a radially outwardly shoulder 18 in the form of a ring coaxial with the holding body 16. This shoulder 18 is located between the annular stop shoulder 14 and the annular stop shoulder 15, so that the holding body 16 is thereby a captive in the lead-through 11.

On the outside of the holding body 16, there is disposed a helical compression spring 19 which is coaxial with the holding body 16 and is braced at one end thereof against the stop shoulder 14 of the sleeve 12 and at the other end thereof against the shoulder 18 of the holding body 16.

At the end thereof located in the lead-through 11 at the inside of the plate 2 the holding body 16 is formed with an external thread 20 which fits the internal thread 10 formed on the sleeve 9. The sleeve 13 is provided, furthermore, on the inner surface thereof with a polygonal cross section which fits the polygonal outer contour of the cross section at the end 9b of the sleeve 9 on the holding rod 4 i.e. the outside contour is that of a regular octagon.

The hollow cylindrical sleeve of which the holding body 16 is formed also has, at the end thereof which is at the upper side of the plate 2, as viewed in FIG. 2, the cross section of a regular hexagon as an inner cross section which fits the outer cross section of a remotely controlled key 21 which is associated with the support body 16.

For fastening the holding rod 4 to the support plate 2, the end 9b of the sleeve 9 is placed on the holding rod 4 at the end of the holding body 16 on the inside of the support plate 2. Then, the holding body 16 is rotated or turned about the longitudinal axis 17 thereof by means of the key 21 which is inserted therein at the outside of the support plate 2. The internal thread 10 of the sleeve 9 is screwed on the external thread 20 of the holding body 16, and the sleeve 9, which is rigidly fastened to the holding rod 4, is screwed to the holding body 16 until the shoulder 18 at the outside of the holding body 16 is tightened against holding shoulder 15, which is disposed within the lead-through 11 between the stop shoulder 14 and the other holding plate 3. The inner contour of the sleeve 13 which fits the outer contour of the sleeve 9 at the end 9b thereby prevents the sleeve 9 engaging in the lead-through 11 and thereby, the holding rod 4 from being entrained and co-rotated about the longitudinal axis coinciding with the common longitudinal axis 17 of the lead-through 11 and the holding body 16.

Depending upon the length thereof, the holding rods 4 and 5 are screwed onto the holding body 16 at varying heights. By means of the pressure with which the coil spring 19 presses the shoulder 18 additionally against the stop shoulder 15 in axial direction, a frictional connection is formed between the shoulder 18 and the stop shoulder 15 which ensures a firm seating of the screw connection between the support plate 2 and the holding rod 4.

By means of the key 21, this frictional connection can also be overcome again, if the nuclear reactor fuel assembly is to be disassembled once more after insertion into an operating nuclear reactor, and the holding rod 4 is to be separated from the support plate 2 by loosening the screw connection between the holding body 16 and the sleeve 9.

The foregoing is a description corresponding in substance to German Application No. P 32 40 061.6, dated Oct. 28, 1982, the International Priority of which is being claimed for the instant application, and which is hereby made part of this application. Any material discrepancies between the foregoing specification and the aforementioned corresponding German application are to be resolved in favor of the latter.

I claim:

1. Nuclear reactor fuel assembly with two support plates and a holding rod connecting the two support plates rigidly with mutual spacing, the holding rod having a longitudinal axis passing through both support plates, and being held at one end in a lead-through in one of the two support plates, said one support plate being formed of a single plate, comprising, in the lead-through, an elongated holding body for receiving the holding rod therein, said holding body having a longitudinal axis coinciding with that of the lead-through and being rotatable about the longitudinal axis thereof and displaceable in a direction of the longitudinal axis thereof; said lead-through being formed with a stop shoulder at an outer side of the one support plate, said stop shoulder being spaced from a first holding shoulder in the axial direction of said lead-through; means for rotating said holding body or the holding rod relative to one another about said longitudinal axis so as either to connect said holding body rigidly to an end of the holding rod and tighten it against a second holding shoulder formed in the one support plate or so as to detach said holding body, from the holding rod; said second holding shoulder, as viewed in a direction of said longitudinal axis of the holding rod, being located between said stop shoulder and the other side of said one support plate; and a spring element braced against said stop shoulder and pressing said holding body elastically against said holding shoulder; said spring element being braced at one end thereof against said stop shoulder and, at the other end thereof, against said first holding shoulder at the outside of said holding body.

2. Nuclear reactor fuel assembly according to claim 1, wherein said second shoulder is located with said holding body and is tightenable against said second holding shoulder within said lead-through.

3. Nuclear reactor fuel assembly according to claim 1, wherein said end of the holding rod is secured at the lead-through against relative rotation about said longitudinal axis with respect to the support plate.

4. Nuclear reactor fuel assembly according to claim 1, wherein said end of the holding rod is formed like a sleeve and has an internal thread, and wherein said holding body is cylindrical and has an external thread for screwing the sleeve-like end of the holding rod thereon.

5. Nuclear reactor fuel assembly according to claim 3, wherein said end of the holding rod has a cross section with a polygonal outer contour and engages said lead-through which is formed with a matching polygonal cross section for securing the holding rod against said relative rotation with said holding body.

6. Nuclear reactor assembly according to claim 1, wherein said spring element is a compression coil spring mounted on the outside of said holding body and being coaxial therewith.

* * * * *